(12) United States Patent
Madsen et al.

(10) Patent No.: US 7,371,402 B2
(45) Date of Patent: May 13, 2008

(54) USE OF A COMPOSITION

(75) Inventors: Finn Madsen, Viby J (DK); Stig Groven, Horsens (DK)

(73) Assignee: Danisco A/S, Copenhagen (DK)

(*) Notice: Subject to any disclaimer, the term of this patent is extended or adjusted under 35 U.S.C. 154(b) by 1264 days.

(21) Appl. No.: 10/376,512

(22) Filed: Feb. 28, 2003

(65) Prior Publication Data

US 2003/0162746 A1    Aug. 28, 2003

Related U.S. Application Data

(60) Division of application No. 09/780,880, filed on Feb. 12, 2001, now Pat. No. 6,528,085, which is a continuation-in-part of application No. PCT/IB99/01476, filed on Aug. 13, 1999.

(30) Foreign Application Priority Data

Aug. 14, 1998  (GB)  ................................. 9817805.6

(51) Int. Cl.
*A61K 47/00* (2006.01)
(52) U.S. Cl. ...................................... 424/439; 424/400
(58) Field of Classification Search ................ 424/400, 424/439

See application file for complete search history.

(56) References Cited

U.S. PATENT DOCUMENTS

| | | | |
|---|---|---|---|
| 4,529,613 A | 7/1985 | Mezzino et al. | |
| 5,286,511 A | 2/1994 | Klavons et al. | |
| 5,639,494 A | 6/1997 | Grassin et al. | |
| 5,648,112 A | 7/1997 | Yang et al. | |
| 5,690,975 A | 11/1997 | Akahoshi et al. | |
| 5,707,847 A | 1/1998 | Christgau et al. | |
| 5,780,081 A | 7/1998 | Jacobson et al. | |
| 5,866,190 A | 2/1999 | Barey | |
| 6,143,346 A | 11/2000 | Glahn | |
| 6,159,503 A | 12/2000 | Glahn | |
| 6,207,194 B1 | 3/2001 | Glahn | |
| 6,221,419 B1 | 4/2001 | Gerrish | |
| 6,428,837 B1 * | 8/2002 | Luzio et al. | 426/599 |
| 6,699,977 B1 | 3/2004 | Gerrish et al. | |

FOREIGN PATENT DOCUMENTS

| | | |
|---|---|---|
| EP | 0 664 300 | 7/1995 |
| EP | 0 664 300 A1 | 7/1995 |
| EP | 0 709 033 A1 | 5/1996 |
| GB | 1474990 | 5/1977 |
| GB | 2194876 A | 3/1988 |
| GB | 2342921 | 4/2000 |
| WO | 89/12648 | 12/1989 |
| WO | WO 89/12648 | 12/1989 |
| WO | 91/15517 | 10/1991 |
| WO | 94/25575 | 11/1994 |
| WO | 97/03574 | 2/1997 |
| WO | WO 97/03574 | 2/1997 |
| WO | WO 98/47391 | 10/1998 |
| WO | 00/08952 | 2/2000 |
| WO | 00/15830 | 3/2000 |
| WO | 01/96590 | 12/2001 |

OTHER PUBLICATIONS

Database WPI, Section Ch, Week 198021, Derwent Publications Ltd., London, GB; AN 1980-37457C, referred to as XP-002122724 and JP 55 050885 A (Ajinomoto KK), Apr. 14, 1980, Abstract.
Pilnik and Voragen, "The Significance of Endogenous and Exogenous Pectic Enzymes in Fruit and Vegetable Processing," Food Enzymology, Ed.; P.F. Fox; Elsevier 1991, pp. 303-337.
English Language Abstract of JP 8112059, 2000.
Kravtchenko et al., Food Macromolecules and colloids; proceedings of a conference, Dijon, Mar. 1994, 349-355, "Colloidal Stability and Sedimentation of Pectin-Stablized Acid Milk Drinks".
Kravtchenko et al., "Characterization of Industrial High Methoxy Pectins", pp. 26-35, date not available.
Parker et al., "Effect of the Addition of High Methoxy Pectin on the Rheology and Colloidal Stability of Acid Milk Drinks", pp. 307-312, 1994.
Glahn, FIA-Japan, PEG/JK (dai-24a)-Apr. 4, 1995, pp. 1-6, Fig. 1 & pp. 1-4, & 1-4 & 1-3.
Glahn et al., Gums and Stabilisers for the Food Industry B, edited by Phillips et al., IIRL Press, Properties and Food Uses of Pectin Fractions, pp. 393-402, date not available.
Glahn, Prog. Fd. Nutr. Sci., vol. 6, pp. 171-177, 1982, "Hydrocolloid Stabilization of Protein Suspensions at Low pH".
Speiser et al., Journal of the American Chemical Society, vol. 68 Feb. 1946, pp. 117-133, "Effect of Molecular Association and Charge Distribution of the Gelation of Pectin".
Speiser et al., "Effect of Molecular Weight and Method of Deesterificiation on the Gelling Behavior of Pectins", 1946, pp. 287-293.
Kohn et al, Die Nahrung, vol. 29, (1985)I, pp. 75-85.
Markovic et al., Experientia (Base1)40(8), 1984, pp. 842-843.

(Continued)

*Primary Examiner*—Dameron L. Jones
(74) *Attorney, Agent, or Firm*—Frommer Lawrence & Haug LLP; Thomas J. Kowalski; Angela M. Collison (57) ABSTRACT

There is provided use of a pectin composition to prepare an aqueous composition having high yield stress characteristics without substantial gelation, wherein the pectin composition comprises at least a population of pectin that is calcium sensitive; wherein the pectin composition is capable of imparting high yield stress characteristics to an aqueous composition without causing substantial gelatin of the aqueous composition. There is also provided a standardised acidic aqueous composition comprising a deesterified pectin dissolved in water wherein the pH of the aqueous solution is less than 6, and wherein the deesterified pectin has a degree of esterification from about 50-60% and has a calcium fraction greater than 15; and wherein the amount of the deesterified pectin in the aqueous solution is from about 0.1 to 0.5%.

1 Claim, 7 Drawing Sheets

OTHER PUBLICATIONS

Industrial Gums—Polysaccharides and Their Derivatives, Third Edition, Ed. by Whistler et al., Academic Press, New York, 1993, Chapter 10, pp. 257-291.

Matsuura et al., Agric. Biol. Chem., 51(6), 1675-1677, 1987, "Limit to the Deesterification of Citrus Pectin by Citrus Pectinesterase".

Hill et al., Food Technology, vol. 3, Mar. 1949, pp. 90-93, "Enzyme-Demethylated Pectinates and Their Gelation".

Jarvis, Plant, Cell and Environment (1984) 7, 153-164, "Structure and Properties of Pectin Gels in Plant Cell Walls".

Solms et al., Helv. Chim. Acta, 38, pp. 321-329, "Uber den Mechanismas der enzymatischen Verseifung von Pektinstoffen", (1955).

Kohn et al., Collect. Checz. Chem. Commun., 33, pp. 264-269, 1968, "Distribution of Free Carboxyl Groups in the Pectin Molecule After Treatment With Pectin Esterase".

Rolin, "Calcium Sensivitity of High Ester Citrus Pectins", 1994, Oxford University Press, edited by Glyn O. Phillips et al., pp. 413-422.

* cited by examiner

USE OF A COMPOSITION

RELATED APPLICATIONS

This application is a divisional of allowed U.S. patent application Ser. No. 09/780,880 filed Feb. 12, 2001 now U.S. Pat. No. 6,528,085, which is a continuation-in-part of PCT/IB99/01476, filed Aug. 13, 1999, designating the U.S. and published as WO 00/08952 on Feb. 24, 2000, claiming priority from Great Britain patent application no. 9817805.6, filed Aug. 14, 1998. All of the foregoing applications, as well as all documents cited in the foregoing applications ("application documents") and all documents cited or referenced in application documents are hereby incorporated herein by reference. Also, all documents cited in this application ("herein cited documents") and all documents cited or referenced in herein cited documents are hereby incorporated herein by reference.

The present invention relates to a use of a composition. In particular, the present invention relates to a use of a pectin composition.

Pectin is an important commodity in today's industry. For example, it can be used in the food industry as a thickening or gelling agent, such as in the preparation of jams or fruit systems for yoghurt.

Pectin is a structural polysaccharide commonly found in the form of protopectin in plant cell walls. The backbone of pectin comprises α-1-4 linked galacturonic acid residues which are interrupted with a small number of 1,2 linked α-L-rhamnose units. In addition, pectin comprises highly branched regions with an almost alternating rhamno-galacturonan chain. These highly branched regions also contain other sugar units (such as D-galactose, L-arabinose and xylose) attached by glycosidic linkages to the C3 or C4 atoms of the rhamnose units or the C2 or C3 atoms of the galacturonic acid units. The long chains of α-1-4 linked galacturonic acid residues are commonly referred to as "smooth" regions, whereas the highly branched regions are commonly referred to as the "hairy regions".

Some of the carboxyl groups of the galacturonic residues are esterified (e.g. the carboxyl groups are methylated). Typically esterification of the carboxyl groups occurs after polymerisation of the galacturonic acid residues. However, it is extremely rare for all of the carboxyl groups to be esterified (e.g. methylated). Usually, the degree of esterification will vary from 0-90%. If more than 50% of the carboxyl groups are esterified then the resultant pectin is referred to as a "high ester pectin" ("HE pectin" for short) or a "high methoxyl pectin". If less than 50% of the carboxyl groups are esterified then the resultant pectin is referred to as a "low ester pectin" ("LE pectin" for short) or a "low methoxyl pectin". If 50% of the carboxyl groups are esterified then the resultant pectin is referred to as a "medium ester pectin" ("ME pectin" for short) or a "medium methoxyl pectin". If the pectin does not contain any—or only a few—esterified groups it is usually referred to as pectic acid.

LE pectins have for a long time been used in yoghurt fruit as a stabilising agent to ensure a certain yield stress and consequently uniform distribution of fruit without giving a too high viscosity. However, LE pectins tend to form a gel and any gelation should be avoided.

Gelation is detrimental to the appearance of many food products and may also result in undesirable organoleptic properties. Gelation of a product may also prohibit the pumping of that product. Pumping is a widely used method for manipulating products during manufacture and application, and consequently pumpability is a demand in many applications, e.g. yoghurt fruit application.

The prior art has attempted to overcome the above problems. The prior art has provided "pregelled" systems which although they may overcome some of the above problems, produce a product which is grainy with a dull appearance. Furthermore, such pregelled products has a strong tendency to syneresis.

The present invention aims to overcome the problems of the prior art.

According to a first aspect of the present invention there is provided use of a pectin composition to prepare an aqueous composition having high yield stress characteristics without substantial gelation, wherein the pectin composition comprises at least a population of pectin that is calcium sensitive; wherein the pectin composition is capable of imparting high yield stress characteristics to an aqueous composition without causing substantial gelation of the aqueous composition.

The present invention is advantageous in that it may provide an aqueous composition which is smooth and shiny in appearance without exhibiting syneresis, in contrast to the pre-gelled systems of the prior art.

The term "pectin" includes fractions of pectin, one or more compounds from the class of compounds known as pectins, and derivatives thereof.

The term "derivatives thereof" includes derivatised pectin and degraded pectin (such as partially degraded pectin) and modified pectin.

The term "population of pectin that is calcium sensitive" means a population of pectin which has a calcium sensitivity index (CF) not equal to 1. A Protocol for determining calcium sensitivity may be found on page 57 of WO-A-97/03574 (the contents of which are incorporated herein by reference). For ease of reference, this Protocol is recited at the end of the Examples section (infra) as Protocol I.

Preferably, the population of pectin has a CF of greater than 1.2. More preferably, the population of pectin has a CF of greater than 5. Yet more preferably, the population of pectin has a CF of greater than 15.

Preferably, the pectin composition has a CF of greater than 1.2. More preferably, the pectin composition has a CF of greater than 5. Yet more preferably, the pectin composition has a CF of greater than 15.

In the present specification, by the term "having a high yield stress" it is meant that the yield stress of the aqueous composition as measured in accordance with the Protocol II is at least 1.0 Pa. Protocol II is recited at the end of the Examples section (infra)

Preferably, the yield stress of the aqueous composition is greater than 3.0 Pa. Yet more preferably, the yield stress of the aqueous composition is greater above 5.0 Pa.

In the present specification, by the term "without substantial gelation" it is meant that the maximum viscosity of a standardised aqueous composition measured in accordance with the Protocol III is no greater than 500 Pa. Protocol III is recited at the end of the Examples section (infra).

Preferably, the pectin composition is capable of imparting a high degree of shear thinning to an aqueous composition. A high degree of shear thinning is an important rheological characteristic in liquid and semi-liquid systems to facilitate pumping and to secure a good non-sticky mouthfeel.

The degree of thixotropy of the aqueous composition may be varied from application to application. If stabilisation of suspended particles is required, the aqueous composition is preferably able to build up structure after shearing with low thixotropy. If a degree of flow after shearing is required, a degree of thixotropy is desirable and may be provided by the pectin composition. The pectin composition may be used in accordance with the present invention to control the above rheological characteristics. This control may be achieved by controlling, among other things, the degree of esterification (% DE), the proportion of the pectin composition which is calcium sensitive (% CSP), the calcium sensitivity of the calcium sensitive population of pectin (CS), the molecular weight of the pectin composition and/or the concentration of calcium in the aqueous composition.

Degree of thixotropy, shear thinning and shear reversibility may be evaluated by performing a flow curve experiment in accordance with Protocol IV. Protocol IV is recited at the end of the Examples section (infra).

Preferably, the aqueous composition has a low viscosity at a shear rate of $0.1\ s^{-1}$.

In the present specification, by the term "low viscosity" it is meant that the viscosity at a shear rate of $0.1\ s^{-1}$, measured in accordance with Protocol IV, is less than 100 Pa·s, preferably less than 80 Pa·s.

Thus, in a second aspect the present invention provides use of a pectin composition to prepare an aqueous composition having high yield stress characteristics and a low viscosity at a shear rate of $0.1\ s^{-1}$, wherein the pectin composition comprises at least a population of pectin that is calcium sensitive; wherein the pectin composition is capable of imparting to an aqueous composition high yield stress characteristics and a low viscosity at a shear rate of $0.1\ s^{-1}$.

The calcium sensitive pectin population can comprise any one or more of a low ester pectin, a medium ester pectin or a high ester pectin. Preferably, the calcium sensitive pectin population comprises a high ester pectin. Preferably, the calcium sensitive pectin population does not comprises a low ester pectin or a medium ester pectin.

Preferably, the degree of esterification of the calcium sensitive pectin population is from 50 to 90%. More preferably, the degree of esterification is from 60 to 85%. More preferably, the degree of esterification is from 60 to 80% or 65 to 85%. Yet more preferably, the degree of esterification is from 65 to 80%.

Preferably, the degree of esterification of the total pectin composition is from 50 to 90%. More preferably, the degree of esterification is from 60 to 80% or 65 to 85%. Yet more preferably, the degree of esterification is from 65 to 80%.

A Protocol for determining the degree of esterification of a pectin may be found on page 58 of WO-A-97/03574 (the contents of which are incorporated herein by reference). For ease of reference, this Protocol is recited at the end of the Examples section (infra) as Protocol V.

The structure of pectin, in particular the degree of esterification of pectin and the degree of block structure i.e. the degree of distribution of ester groups and free carboxyl groups in blocks, controls many of the physical properties of the pectin. Thus, modification and/or control of the degree of esterification and degree of block structure may be important.

The degree of esterification and/or degree of block structure may be modified and/or controlled by any method. Examples of suitable methods are acid hydrolysis, alkali hydrolysis, use of other chemical de-esterification agents, or by use of enzymes. Suitable enzymes can be obtained from plants or micro-organisms such as bacteria, yeast or fungi. The enzymes disclosed in the review prepared by Pilnik and Voragen (Food Enzymology, Ed.: P. F. Fox; Elsevier; (1991); pp: 303-337) may be used.

Preferably, the degree of esterification of the pectin composition is modified and/or controlled by use of a pectin methylesterase (EC 3.1.1.11), otherwise referred to as a PME. PMEs de-esterify HE pectins to LE pectins or pectic acids.

The use of PMEs is advantageous because PME activity produces free carboxyl groups and free methanol. The increase in free carboxyl groups and thus the degree of esterification can be easily monitored by automatic titration.

For example, the degree of esterification of the calcium sensitive pectin population is modified and/or controlled in accordance with a process described in WO 98/47391 (which claims priority from British Patent Application No 9708278.8).

Preferably the pectin composition is obtainable or is obtained by fractionation of a pectin or a pectin composition. Using fractionation techniques a pectin composition may be obtained which is enriched in one or more specific calcium sensitive pectin populations.

Preferably the pectin composition is obtainable or is obtained by selecting peels from a citrus fruit, for instance lime and/or lemon, and extracting the pectin by a process comprising the steps of:

Extraction
  Mixing the peel with water at a water:peel ratio of 21:1
  Adjusting, if necessary, the pH to 1.9-2.3 using nitric acid
  Heating to a temperature of 68-71° C. for 3-6 hours Filtration
  After extraction the pectin solution is filtered.

Precipitation
  Reducing the temperature to 36-40° C.
  Adjusting the pH to 2.6-2.9
  Adding isopropyl alcohol until precipitation occurs. Typically an isopropyl alcohol concentration of 49-58 w/w % is required.

Post Treatments
  After precipitation the pectin may be dried and/or milled.
  Preferably, the use of the present invention provides an aqueous composition.

Thus, in a third aspect of the present invention there is provided an aqueous composition prepared in accordance with the use of the present invention.

The aqueous composition of the present invention may comprise one or more other components, such as one or more suitable food ingredients. Typical food ingredients include any one or more of a salt, a protein, an acid—such as citric acid—or a sugar—such as sucrose, glucose or invert sugar—or fruit—or enzymes.

The present invention can be used in the preparation of pharmaceutical products, foodstuffs and non-food products.

Typical pharmaceutical products include clinical nutritive products (enteral products and other liquid products).

Typical non-food products include de-icing agents and paints.

The term "foodstuff" can include food for human and/or animal consumption.

Typical foodstuffs include jams, fruit preparations, fruit fillings, ripples, fruit sauces, stewed fruit, dairy products (such as milk products and ice cream), fine foods (such as salad dressings, ketchup, vinaigrette dressings and soups), meat products, poultry products, fish products and bakery products. The foodstuff may be a beverage. The beverage may be a drinking yoghurt, a fruit juice, a beverage concentrate or a fruit based beverage.

The present invention may be used in the preparation of a starting reagent or an intermediate in the preparation of a foodstuff.

Alternatively, present invention may be used in the preparation of a foodstuff itself.

Preferably, the pectin composition comprises no greater than 5.0 wt % of aqueous composition based on the total weight of the aqueous composition. More preferably, the pectin composition comprises no greater than 0.1-1.5 wt % of aqueous composition based on the total weight of the aqueous composition.

Preferably, the pectin composition and/or the aqueous composition further comprises one or more metal ions. Preferably, the one or more metal ions comprise metal ions selected from ions of elements of Group II of the Periodic Table. Yet more preferably, the one or more metal ions comprise at least $Ca^{2+}$ ions.

In a further preferred embodiment, the pectin composition and/or aqueous composition comprises 25-300 mg of metal ions per gram of pectin. In yet a further preferred embodiment, the pectin composition and/or aqueous composition comprises 50-150 mg of metal ions per gram of pectin.

In a further preferred embodiment, the pectin composition and/or aqueous composition comprises 25-300 mg of $Ca^{2+}$ ions per gram of pectin. In yet a further preferred embodiment, the pectin composition and/or aqueous composition comprises 50-150 mg of $Ca^{2+}$ ions per gram of pectin.

In the above embodiment the metal ions may be introduced in to the pectin composition by adding the metal ions to the pectin composition during production thereof or it can be added to the dry pectin composition afterwards. In one alternative, the metal ions may be introduced in to the pectin composition by adding the metal ions to the pectin composition in the presence of water.

The metal ions may be introduced in to the aqueous composition by adding the metal ions directly thereto before or after the introduction of the pectin composition in to the aqueous composition.

The metal ions, preferably calcium, may be added as a metal ion salt. For example the metal ion may be added in the citrate form of the metal, for example, calcium citrate.

An example of the combination of metal ions and pectin composition in accordance with the present invention to provide an aqueous composition in accordance is given below:

1) A pectin with a pH value of 5 is mixed with calcium citrate
2) The mixture is dissolved in water. Under the pH conditions i.e. a pH of 5, only the pectin will dissolve.
3) The pH is lowered to a level below 4. On lowering pH the calcium citrate will dissolve, releasing the calcium. Once the calcium is released it will become available and an aqueous composition exhibiting high yield stress characteristics without substantial gelation is obtained.

It is essential that the pectin composition for use in the present invention comprises a population of pectin that is calcium sensitive. However, the pectin composition for use in the present invention may further comprise at least one calcium insensitive pectin.

Preferably, the population of pectin that is calcium sensitive comprises at least 40 wt % of the pectin composition. More preferably, the population of pectin that is calcium sensitive comprises at least 50 wt % of the pectin composition. More preferably, the population of pectin that is calcium sensitive comprises at least 60 wt % of the pectin composition. More preferably, the population of pectin that is calcium sensitive comprises at least 70 wt % of the pectin composition. Yet more preferably, the population of pectin that is calcium sensitive comprises at least 80 wt % of the pectin composition.

The proportion of the pectin composition that is calcium sensitive may be determined in accordance with the method of Protocol VI. Protocol VI is recited at the end of the Examples section (infra).

Preferably, the pectin composition has a reduced viscosity of at least 0.25 L/g. More preferably, the pectin composition has a reduced viscosity of at least 0.375 L/g. Yet more preferably, the pectin composition has a reduced viscosity of at least 0.50 L/g. Reduced viscosity may be measured in accordance with Protocol VII. Protocol VII is recited at the end of the Examples section (infra).

In the present specification we have described that the present invention relates to the use of a pectin composition. However, the present invention also encompasses the use of any polysaccharide to provide the advantageous properties of the present invention. Thus, in a broad aspect, the present invention provides the use of a polysaccharide composition to prepare an aqueous composition having high yield stress characteristics without substantial gelation; wherein the polysaccharide composition is capable of imparting high yield stress characteristics to an aqueous composition without causing substantial gelation of the aqueous composition.

Alternatively, in a broad aspect the present invention provides the use of a composition comprising a pectin isostere to prepare an aqueous composition having high yield stress characteristics without substantial gelation, wherein the pectin isostere composition is capable of imparting high yield stress characteristics to an aqueous composition without causing substantial gelation of the aqueous composition.

In a further broad aspect the present invention provides a pectin composition, wherein the pectin composition comprises at least a population of pectin that is calcium sensitive; wherein the pectin composition is capable of imparting high yield stress characteristics to an aqueous environment without causing substantial gelation of the aqueous environment. In this broad aspect the present invention further provides a process for preparing an aqueous composition, preferably a foodstuff, comprising the step of combining an aqueous medium with a pectin composition, wherein the pectin composition comprises at least a population of pectin that is calcium sensitive; wherein the pectin composition is capable of imparting high yield stress characteristics to an aqueous environment without causing substantial gelation of the aqueous environment.

The invention will now be described, by way of example only, with reference to the accompanying drawings in which.

Figure 1:
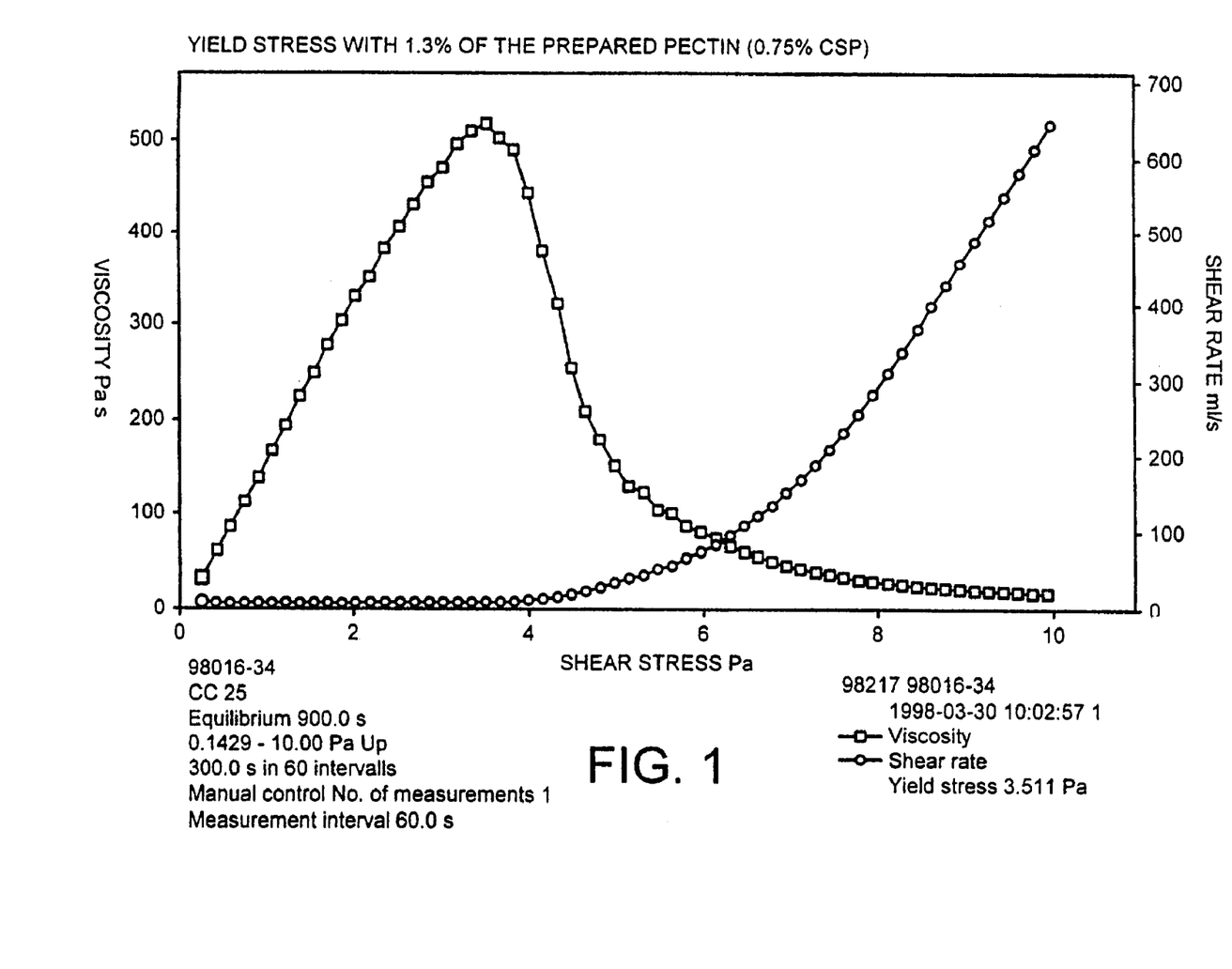
FIG. 1 is a graph of the analysis of a composition.

FIG. 1 shows a yield stress measurement of a pectin composition for use in accordance with the present invention. The procedure for measuring yield stress is described in Protocol II. The yield stress is determined as the force needed (Pa) to break down the structure (point of maximum viscosity). It is seen that the yield stress is rather high, and the viscosity is low (500 Pa s) at structure breakage. It is furthermore seen that the viscosity curve is bell shaped in nature meaning that the breakdown of structure only gradually takes place at stress levels higher than the yield stress. This is a characteristic property of pectin compositions which may be used in accordance with the present invention.

The property means in practice that the pectin composition, even at higher stress levels than the yield stress, retains a substantial part of its structure and thereby stabilising ability. In quantitative terms this is seen as a rather high viscosity and low shear rate measured at stresses somewhat above the yield stress.

Figure 2:
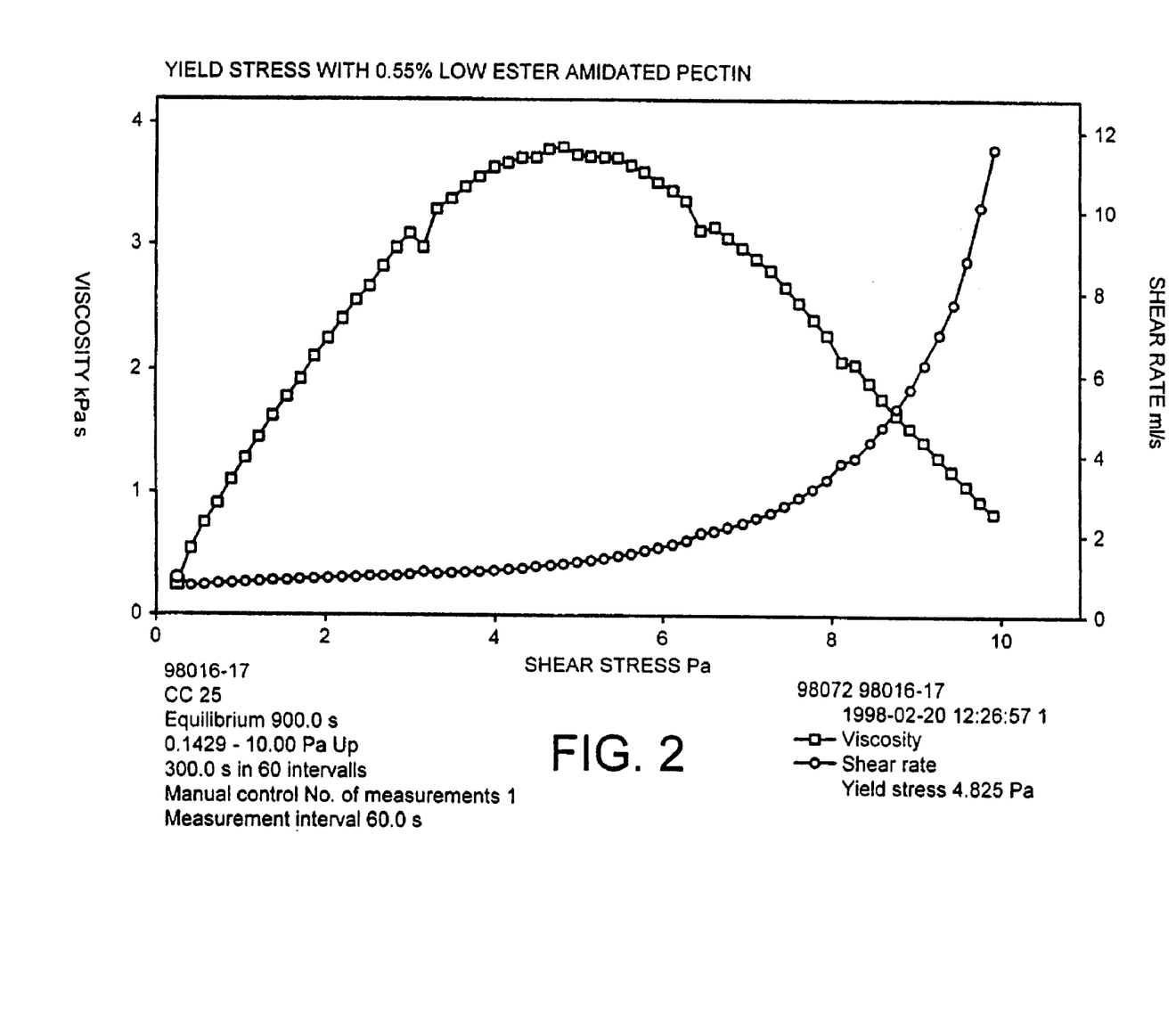
FIG. 2 is a graph of the analysis of a composition.

In a preferred aspect the pectin composition of the present invention has a shear rate of no greater than 500 ml/s at a stress value 2 Pa higher than the yield stress when measured in accordance with Protocol II. This behaviour is completely different from a soft gelled and brittle texture typically obtained by gelling hydrocolloids, where the viscosity curve after passing the yield stress point shows fast reduction of viscosity and the shear rate is increased strongly, illustrating complete loss of stabilising ability. Visually such products are evaluated as brittle gels. FIG. 1 may be compared with FIG. 2 which shows a yield stress measurement of an aqueous composition of a low ester amidated pectin, where a pregelled texture is obtained to avoid gelling. Such an aqueous composition of a low ester amidated pectin composition would typically be used in food applications. Even though a bell shaped yield stress curve is obtained indicating stabilising ability even somewhat above the yield stress, the aqueous composition of the low ester amidated pectin composition is disadvantageous due to the very high viscosity at the yield stress. Moreover the aqueous composition of low ester amidated pectin composition is disadvantageous, because it is dull and grainy.

Figure 3:
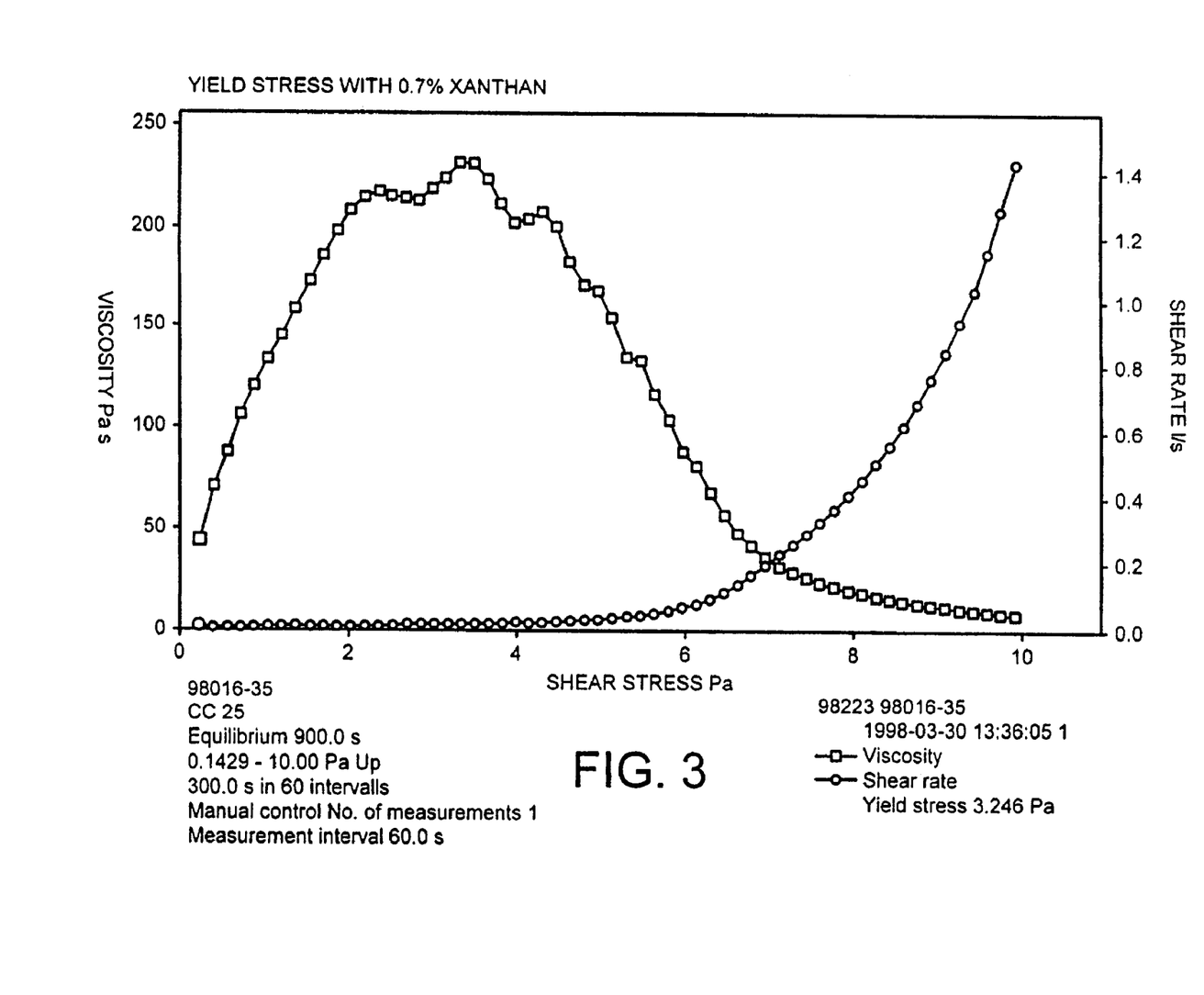
FIG. 3 is a graph of the analysis of a composition.
Figure 7:
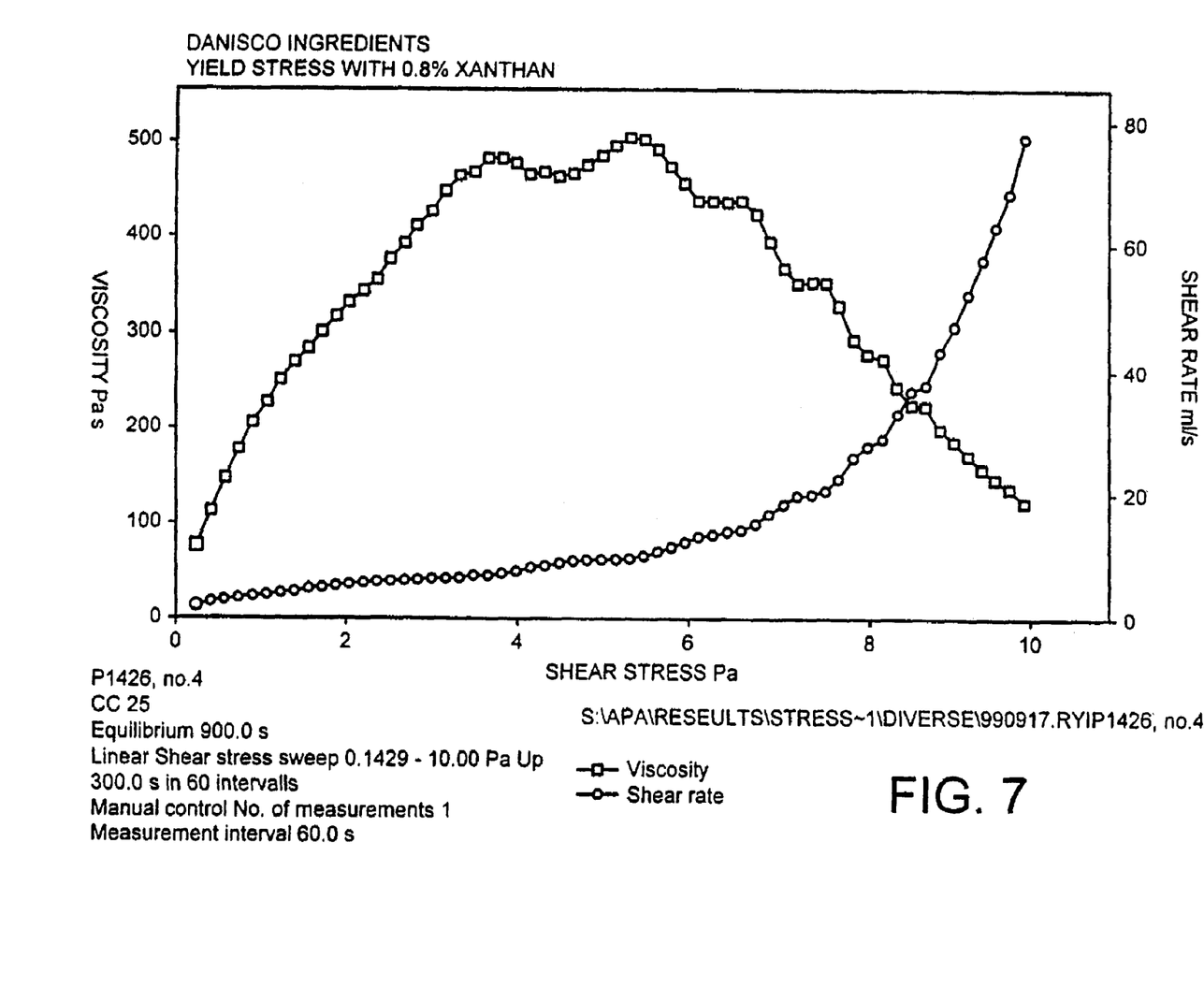
FIG. 7 is a graph of the analysis of a composition.

When FIG. 1 is compared to FIG. 3 it can be seen that the yield stress level, bell shaped viscosity curve and viscosity at structure breakage of the pectin composition for use in the present invention are comparable with that obtained when using a 0.7% xanthan composition. FIG. 1 may be compared in a similar manner to FIG. 7 illustrating the yield stress measurement of a 0.8% xanthan composition.

Thus the pectin composition for use in the present invention provides an aqueous composition having high yield stress and still a low viscosity, and furthermore the appearance of the aqueous composition is smooth and shiny, in contrast to the product obtained using low ester amidated pectin.

Figure 4:
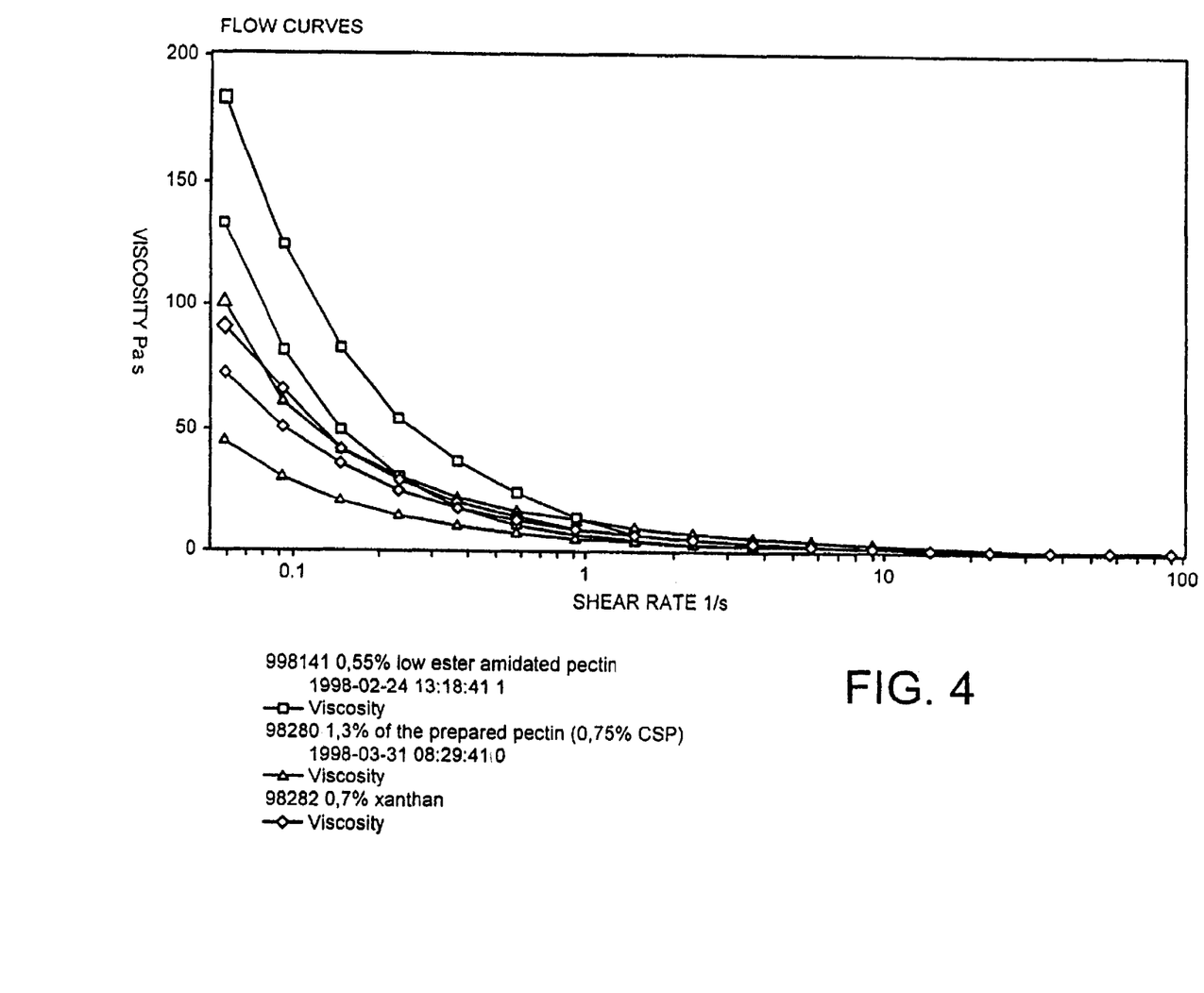
FIG. 4 is a graph of the analysis of a composition.

FIG. 4 is a graph of the viscosity at varying shear rates ("flow curves") of a yoghurt fruit recipe prepared in accordance with the present invention. The procedure for measuring flow curves is described in protocol IV. For comparison, flow curves are also produced on the same yoghurt fruit recipe, where the pectin composition has been substituted with 0.55% low ester amidated pectin or 0.7% xanthan. It can be seen, that the viscosity at low shear rates (e.g. $0.1\ s^{-1}$) for the aqueous composition comprising pectin composition used in the present invention is lower than for the aqueous composition comprising low ester amidated pectin and more comparable with xanthan.

Figure 5:
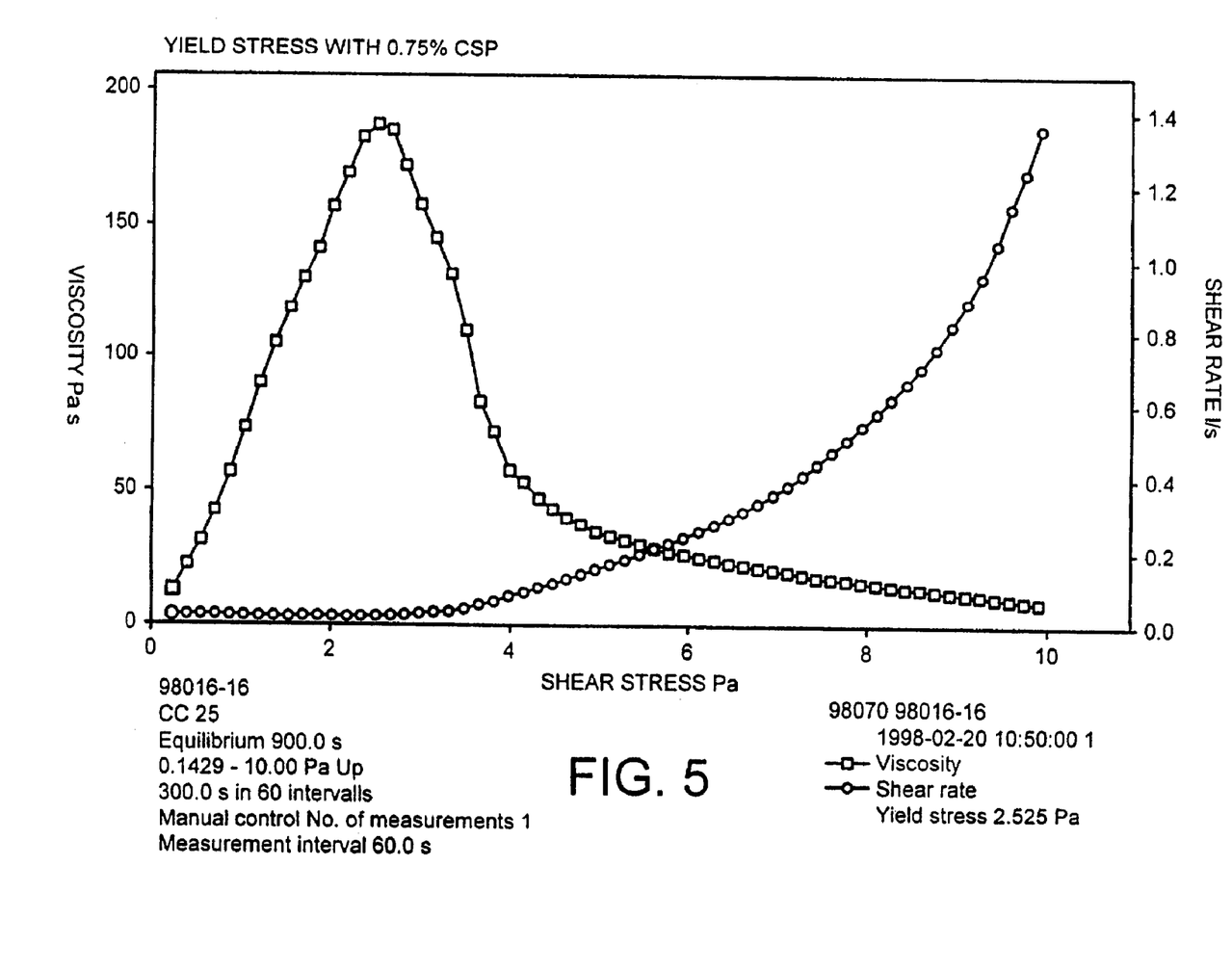
FIG. 5 is a graph of the analysis of a composition.
Figure 6:
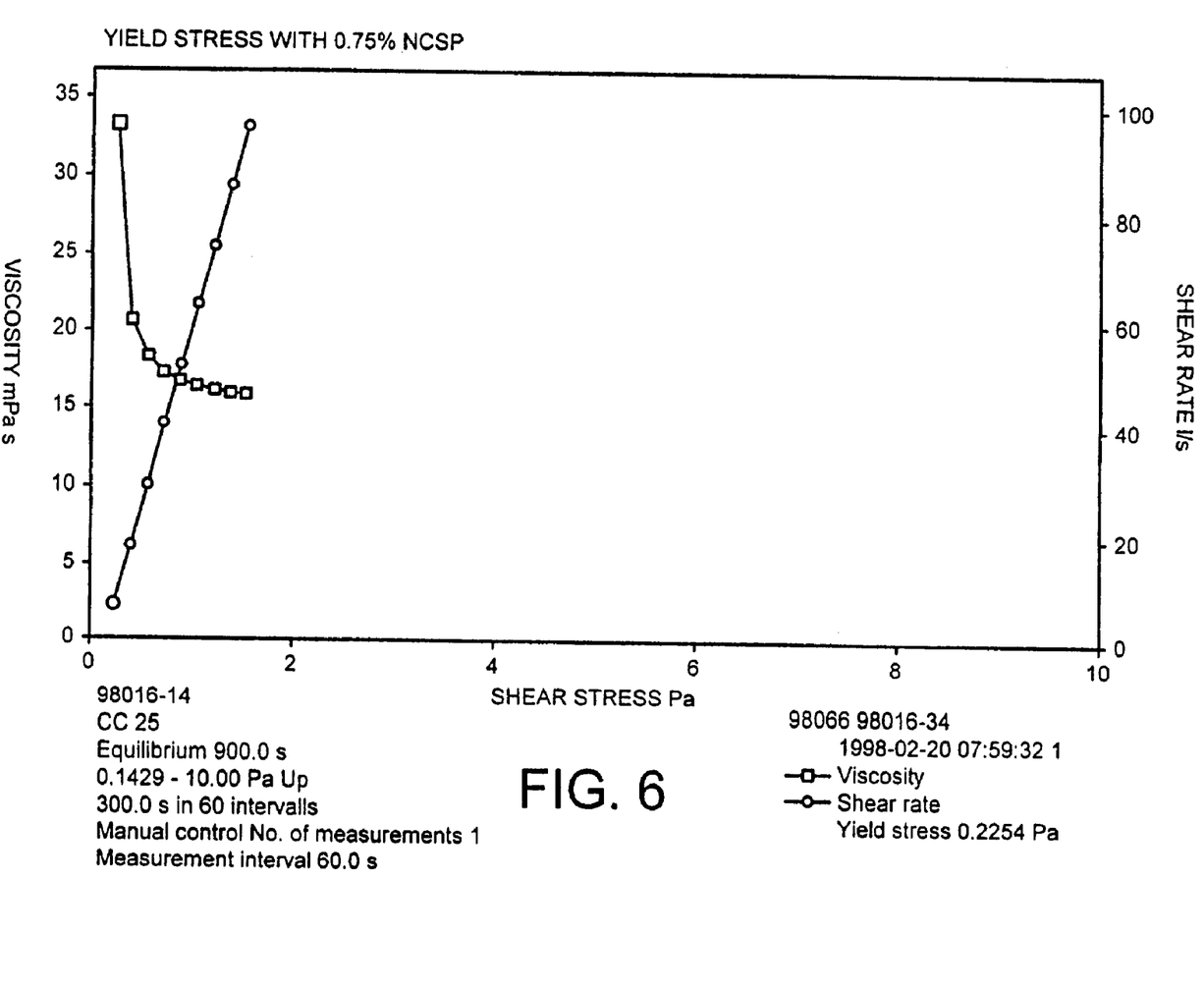
FIG. 6 is a graph of the analysis of a composition.

Two aqueous compositions, one containing a pectin composition consisting of calcium sensitive pectin population and the other containing a pectin composition consisting of a non-calcium sensitive pectin population were produced to document the importance of the presence of a calcium sensitive pectin population. A high ester pectin raw material was fractionated into two pectin compositions. One of the pectin compositions (referred to as CSP composition) contained almost pure calcium sensitive pectin (CSP), determined in accordance with the method of Protocol VI. The other pectin composition (referred to as NCSP composition) contained 0% CSP (100% non calcium sensitive pectin (NCSP)). The CSP composition and NCSP composition were tested for yield stress properties in accordance with Protocol II. A fixed dosage of 0.75% CSP and 0.75% NCSP were used, respectively.

FIGS. 5 and 6 shows the yield stress values obtained. These figures demonstrate that the presence of a calcium sensitive pectin population is essential in the pectin composition for use in the present invention.

The preparation of a pectin in accordance with the present invention and its use in a composition in accordance with the present invention will now be described.

EXAMPLES

Preparation of Pectin

A pectin composition for use in accordance with the present invention may be obtained by selecting peels from a citrus fruit, for instance lime and/or lemon, and extracting the pectin composition by a process comprising the steps of:

Extraction
    Mixing the peel with water at a water:peel ratio of 21:1
    Adjusting, if necessary, the pH to 1.9-2.3 using nitric acid
    Heating to a temperature of 68-71° C. for 3-6 hours Filtration
    After extraction the pectin solution is filtered.

Precipitation
    Reducing the temperature to 36-40° C.
    Adjusting the pH to 2.6-2.9
    Adding isopropyl alcohol until precipitation occurs. Typically an isopropyl alcohol concentration of 49-58 w/w % is required.

Post Treatments
    After precipitation the pectin may be dried and/or milled.
    The pectin composition obtained by this process was analysed to have the following characteristics:

| | |
|---|---|
| Degree of esterification (% DE) | 68.1% |
| Loss on drying | 10.6% |
| pH | 3.1 |
| Calcium sensitivity (CF) | 10.4 |
| CSP content | 59.1% |

Example 1

Fruit Preparation with 30% Soluble Solids

A fruit preparation having a formulation shown in Table I below was prepared in accordance with the following procedure.

1) Dry blend the pectin, and sugar and dissolve the blend in hot water (80-90° C.), while agitating vigorously.
2) Mix fruit, sugar and heat to 80-90° C.
3) Add 1) to 2), while agitating vigorously.
4) Heat for some time and add additional water to adjust the solid content.
5) Add calcium lactate (preferably as a slurry) at a minimum temperature of 90° C. under agitation
6) Adjust pH to 3.8-4.0, adjust the soluble solid content to 30% and add flavouring.
7) Cool to 30° C. under agitation
8) Fill at 30° C.

The fruit preparation made according to Example 1 gives a yield stress around 3 Pa which secures very good fruit piece suspension. At the same time the fruit preparation has a low viscosity compared to similar formulations made with traditional amidated low ester pectin giving a fruit preparation with good flowability and pumpability and a very clean mouthfeel property. These properties make the fruit preparation usefull in many types of yoghurts such as stirred fruit yoghurt, layered yoghurts and in twinpot systems as mentioned below.

A stirred fruit yoghurt may be prepared by mixing the fruit preparation into yoghurt (white base), for example, in an amount of 10-20 wt % based on the yoghurt.

The fruit preparation may also be used in two or multi-layered yoghurts without the formation of a gelled layer at the interface.

The fruit preparation may also be used for twin pot systems (where the fruit preparation is in a separate section to the white base yoghurt) giving a fruit preparation with complete fruit piece suspension and a shiny and smooth appearance.

The fruit preparation may also be used for various dessert products.

TABLE I

| Ingredients | wt % |
|---|---|
| Pectin composition according to the invention | 1.3* |
| Sugar | 1.8 |
| Water | 24.7 |
| Strawberry, sliced | 50.0 |
| Sugar | 20.4 |
| Calcium lactate, 5H$_2$O | 1.5 |
| Strawberry Flavouring 10565. NID** | 0.3 |
| Total | 100.0 |
| Final pH | 3.8-4.0 |
| Final % soluble solids | 30 |
| Filling Temperature | 30° C. |

*corresponding to a calcium sensitive pectin population content of 0.75 wt %
**NID—Nature Identical Example 2

Fruit Preparation with 50% Soluble Solids

A fruit preparation having a formulation shown in Table II below was prepared in accordance with the procedure used in Example 1. The fruit preparation was incorporated into a yoghurt as described in Example 1.

The fruit preparation has a high yield stress and good fruit piece suspending properties. Also this fruit preparation has a considerably lower viscosity compared to similar formulations made with traditional amidated low ester pectins, resulting in good flowability and pumpability, and a very clean mouthfeel property.

As mentioned the fruit preparation may be used in all types of yoghurts such as stirred fruit yoghurt, layered yoghurts and in twinpot systems, but also in other dessert systems.

TABLE II

| Ingredients | wt % |
|---|---|
| Pectin composition according to the invention | 1.3* |
| Sugar | 1.4 |

TABLE II-continued

| Ingredients | wt % |
|---|---|
| Water | 7.0 |
| Strawberry, sliced | 45.0 |
| Sugar | 41.3 |
| Water | 2.2 |
| Calcium lactate, 5H$_2$O | 1.5 |
| Strawberry Flavouring 10565, NID** | 0.30 |
| Total | 100.0 |
| Final pH | 3.8-4.0 |
| Final % soluble solids | 50 |
| Filling Temperature | 30° C. |

*corresponding to a calcium sensitive pectin population content of 0.75 wt %
**NID—Nature Identical Example 3

10% Fruit Drink

A fruit drink having a formulation shown in Table III below was prepared in accordance with the following procedure.

1) Dry blend pectin with sugar

2) Dissolve dry-blend in water at 80° C. by agitating vigorously for 15 minutes

3) Add fruit juice, concentrate or puree and add any remaining water

4) Adjust pH and add flavourings and preservatives

5) Add calcium lactate (preferably as a slurry)

6) Heat treat the beverage at 80-90° C. either in a continuous or in a batch system 7) De-aerate the beverage, if necessary 8) Cool to filling temperature and fill aseptically The viscosity level obtained in the fruit drink is relatively low—around 25 mPas (at a shear rate/second of 50) and is comparable to a similar fruit drink made with a CMC and Xanthan gum stabiliser system (GRINDSTED™ JU 543 Stabiliser System available from Danisco Ingredients, Denmark) used in a 0.2% dosage.

Also the yield stress and thus the pulp stabilising effect of the pectin based sample is comparable with the CMC and Xanthan gum based reference (0.2% dosage).

TABLE III

| Ingredients | wt % |
|---|---|
| Pectin composition according to the invention | 0.40* |
| Orange concentrate | 2.0 |
| Sugar | 11.50 |
| Flavouring | 0.3 |
| Water | 85.3 |
| Calcium lactate, 5H$_2$O | 0.5 |
| Total | 100.0 |

*corresponding to a calcium sensitive pectin population content of 0.25 wt %

Example 4

Fruit Drink Concentrate

Cordial/Squash (Dilution Ratio 1:9)

A dilutable fruit drink concentrate having a formulation shown in Table IV below was prepared in accordance with the following procedure.
1) Dry blend pectin with sugar
2) Add dry-blend to water phase
3) Heat to 90° C. for a few minutes, while agitating
4) Add the juice concentrate and continue the heating a few minutes
5) Add the calcium lactate (preferably as a slurry)
6) Dissolve the rest of the sugar at 80° C.
7) De-aerate under vacuum at 80° C.
a) Cool to 40° C. or below and add flavourings, preservatives and clouding agent
9) Continue agitating until the product is homogeneous
10) Bottle/fill Before consumption, the concentrate has to be diluted with tap water in a 1:9 ratio by the consumer. Thus, 1 liter of concentrate gave 10 liters of a ready-to-drink beverage. The beverage is a fresh and slightly acidic fruit drink.

The texture obtained in the beverage concentrate made according to the present invention using the described pectin is comparable with traditional cordial/squash based on alginate/alginic acid as thickener and stabilising agent, used in an equivalent dosage. Thus the ability of the pectin based fruit drink concentrate to be diluted with water is comparable with that of the reference sample.

The use of pectin based fruit drink concentrates will also be applicable in sugar reduced or sugar free formulations. In such formulations the reference will often be stabilised with xanthan gum based stabiliser systems.

TABLE IV

| Ingredients | wt % |
| --- | --- |
| Pectin composition according to the invention | 0.3* |
| Sugar | 3.0 |
| Water | 31.85 |
| Juice concentrate 65-67 °Brix | 15.0 |
| Calcium lactate, 5H$_2$O | 0.4 |
| Sugar | 47.96 |
| Preservative | (as needed) |
| Clouding agent (optional) | 1.0 |
| Flavourings | 0.5 |
| Total | 100.0 |
| Final pH | 3.5 |

*corresponding to a calcium sensitive pectin population content of 0.2 wt %

If the °Brix is lower for the juice concentrate added, the formulation has to be modified to obtain the right final soluble solid content.

Example 5

Vinaigrette Dressing

A vinaigrette dressing having a formulation shown in Table V below was prepared in accordance with the following procedure.
1) Mix water and pectin and heat to 85° C.
2) When pectin is dissolved cool to 30° C.
3) Add salt, sugar and spices and herb to the solution
4) Add oil phase to the solution
5) Add vinegar to the solution
6) Mix for approximately 15 minutes
7) Add calcium lactate slurry
8) Fill The formulation in table V was compared with a similar formulation based on Xanthan gum in 1:1 substitution.

The dressings obtained have the same stability and appearance in an organoleptic evaluation. However the dressing made with the pectin has a yield stress of around 1.5 Pa compared to the xanthan based sample which has a yield stress of more than 4 Pa.

The organoleptic evaluation also shows that the pectin based sample has a very characteristic mouth-feel property in terms of less sticky texture, a more clean eating property and a better flavour release compared to the xanthan based sample.

Viscosity measurements shows that the viscosity of the two samples is close to each other (measured at a shear rate/sec between 50 and 100).

TABLE V

| Ingredients | wt % |
| --- | --- |
| Water | 48.6 |
| Sugar | 9.00 |
| Vinegar 10% | 18.00 |
| Salt | 1.00 |
| Soya oil | 22.00 |
| Parsley flakes | 0.03 |
| Black pepper granulate | 0.02 |
| Mix of herbs | 0.05 |
| Calcium lactate, 5H$_2$O | 0.65 |
| Pectin composition according to the invention | 0.65* |
| Total | 100.00 |

*corresponding to a calcium sensitive pectin population content of 0.40 wt %

Example 6

Dressing

A dressing having a formulation shown in Table VI below was prepared in accordance with the following procedure.
1) Blend water, sugar, potassium sorbate and salt
2) Blend pectin, propylene glycol alginate (PGA) and starch with a little oil and add to the water phase
3) Mix until all ingredients are fully dissolved
4) Add egg yolk to the water phase
5) Add calcium lactate to the water phase
6) Emulsify the remaining of the oil into the water phase
7) Add vinegar and mustard
8) Fill The dressing produced has a good body and cling, and the same texture and stability as typical commercial formulations.

TABLE VI

| Ingredients | wt % |
| --- | --- |
| Water | 50.50 |
| Soya oil | 30.00 |
| Salt | 1.50 |
| Sugar | 4.50 |
| Ultratex 4 | 2.00 |
| Propylene glycol alginate (PGA) | 0.20 |
| Calcium lactate, 5H$_2$O | 0.60 |
| Pectin composition according to the invention | 0.5* |
| Fluid egg yolk | 4.00 |

TABLE VI-continued

| Ingredients | wt % |
| --- | --- |
| Vinegar 12% | 5.00 |
| Mustard | 1.00 |
| Potassium sorbate | 0.20 |
| Total | 100.00 |

*corresponding to a calcium sensitive pectin population content of 0.4 wt %

Example 7

Ice Cream

Ice cream having the formulation shown in Table VII below was prepared according to the following procedure:
1) Heat all liquid ingredients to approx. 40° C.
2) Mix pectin, emulsifier and sugar
3) Mix the dry blend with the liquid ingredients
4) Pasteurise at 80-85° C. for 20-40 seconds
5) Homogenise at 80° C.
6) Cool to ageing temperature, 4° C.
7) Age for min. 4 hours (preferably overnight)
8) Freeze in continuous freezer to desired overrun (100% recommended)
9) Harden in tunnel at −40° C.
10) Store at a temperature below −25° C.

The use of the described pectin/calcium system in the recipe will help reduce the ice crystal formation in the ice cream during production and during freeze storage of the ice cream.

The ice-cream has thus a good heat-shock resistance, and a dry and creamy mouthfeel, with clean-eating properties.

The meltdown of the ice cream made according to the formulation is comparable to an ice cream made with xanthan gum (0.18%). Both of them have a relatively slow meltdown, and slower meltdown compared to standard commercial ice cream.

Also the "first drop" (minutes before the ice cream starts to drip under standardised conditions) is very similar for the ice cream made with pectin and xanthan gum.

Increasing the pectin dosage to only 0.30% gives a considerably improvement of these described properties.

TABLE VII

| Ingredients | wt % |
| --- | --- |
| Dairy cream, 38% milk fat | 23.65 |
| Skimmed milk | 53.55 |
| Skimmed milk powder | 4.90 |
| Pectin composition according to invention | 0.25* |
| Sugar | 12.00 |
| Glucose syrup, DE 42, 75% TS | 5.35 |
| CREMODAN ® Super | 0.3 |
| Flavouring | Optional |
| Colouring | Optional |
| Total | 100.00 |
| Fat (percent) | 9.00 |
| MSNF (percent) | 10.80 |
| Total solids (percent) | 36.35 |

*corresponding to a calcium sensitive pectin population content of 0.15 wt %

Protocol I

Calcium Sensitivity Index (CF)

Calcium sensitivity is measured as the viscosity of a pectin dissolved in a solution with 57.6 mg calcium/g pectin divided by the viscosity of exactly the same amount of pectin in solution, but without added calcium. A calcium insensitive pectin has a CF value of 1.

4.2 g pectin sample is dissolved in 550 ml hot water with efficient stirring. The solution is cooled to about 20° C. and the pH adjusted to 1.5 with 1N HCl. The pectin solution is adjusted to 700 ml with water and stirred. 290 g of this solution is measured individually into 2 viscosity glasses. 10 ml water is added to one of the glasses (double determinations) and 10 ml of a 250 mM $CaCl_2$ solution is added to the other glass under stirring.

50 ml of an acetate buffer (0.5 M, pH about 4.6) is added to both viscosity glasses under efficient magnetic stirring, thereby bringing the pH of the pectin solution up over pH 4.0. The magnets are removed and the glasses left overnight at 20° C. The viscosities are measured the next day with a Brookfield viscometer. The calcium sensitivity index is calculated as follows:

$$CF = \frac{\text{Viscosity of a solution with 57.6 mg Ca}^{2+}/\text{g pectin}}{\text{Viscosity of a solution with 0.0 mg Ca}^{2+}/\text{g pectin}}$$

Protocol II

Yield Stress

An aqueous composition was prepared in accordance with the following procedure
1) The pectin composition was blended in hot water (80-90° C.) while agitating vigorously.
2) Diluting concentrated strawberry juice* at a ratio of 1:6.5 with water to provide strawberry juice having a solid content of 10.0% and a calcium content of 200 ppm.
3) Mix the diluted strawberry juice and pectin composition while agitating vigorously
4) Heat to boiling point
5) Add calcium lactate.$5H_2O$ to provide a level of $Ca^{2+}$/pectin of 150 mg/g**
6) Adjust pH to 3.8-4.0
7) Adjust soluble solid content to 30%
8) Cool to 30° C. under agitation to provide an aqueous composition

* available from Dinter Gmbh. Specification soluble solid content of 65% calcium content of approximately 1300 ppm produced by concentration of strawberry juice, obtained from pressing fresh/frozen strawberries Brix: 64.0-66.0 Acidity: 6.0-7.8% as citric acid, pH 8.1

** This amount of calcium lactate has been optimised for high ester pectin. The amount of calcium lactate may be varied if a medium ester or low ester pectin is to be considered. This optimisation may be achieved by the performance of a series of simple experiments varying the amount of calcium lactate to optimise the high yield stress/non-gelling properties of an aqueous composition containing a pectin composition of the present invention.

The rheological effect of the strawberry juice concentrate is directly related to the amount of calcium in the juice concentrate. The concentrate may be analysed and replaced with a calcium solution e.g. a calcium lactate solution. The present Protocol has been repeated with such a solution and identical results were obtained.

The aqueous composition was stored at room temperature for minimum 48 hours and applied to a Stress Tech CS rheometer supplied by Reologica Instruments AB. The pectin sample was applied as gently as possible without stirring of the sample.

The rheometer was configured as follows

| | |
|---|---|
| Programme: | Yield Stress |
| Measurement System: | CC 25 (25 mm concentric cylinders) |
| Equilibrium time: | 900 s |
| Stress: | 0.1429-10.00 Pa, up |
| Measurement time: | 300.0 s in 60 intervals |
| Temperature: | 25° C. |

The procedure is repeated, if necessary, until the ratio of pectin composition to water required to achieve a maximum viscosity of approximately 500 Pa is determined. This ratio provides a standardised aqueous composition.

The yield stress of a standardised pectin composition is then determined by applying (as gently as possible without stirring of the sample) the standardised aqueous composition which has been stored at room temperature for minimum 48 hours to a Stress Tech CS rheometer supplied by Reologica Instruments AB.

The rheometer was configured as follows

| | |
|---|---|
| Programme: | Yield Stress |
| Measurement System: | CC 25 (25 mm concentric cylinders) |
| Equilibrium time: | 900 s |
| Stress: | 0.1429-10.00 Pa, up |
| Measurement time: | 300.0 s in 60 intervals |
| Temperature: | 25° C. |

The yield stress is determined as the stress giving the maximum viscosity during stress viscometry.

Protocol III

Non-Gelling

An aqueous composition was prepared in accordance with the following procedure
1) The pectin composition was blended in hot water (80-90° C.) while agitating vigorously.
2) Diluting concentrated strawberry juice* at a ratio of 1:6.5 with water to provide strawberry juice having a solid content of 10.0% and a calcium content of 200 ppm.
3) Mix the diluted strawberry juice and pectin composition while agitating vigorously
4) Heat to boiling point
5) Add calcium lactate.5H$_2$O to provide a level of Ca$^{2+}$/pectin of 150 mg/g**
6) Adjust pH to 3.8-4.0
7) Adjust soluble solid content to 30%
8) Cool to 30° C. under agitation to provide an aqueous composition

* available from Dinter Gmbh. Specification soluble solid content of 65% calcium content of approximately 1300 ppm obtained from pressing fresh/frozen strawberries Brix: 64.0-66.0 Acidity: 6.0-7.8% as citric acid, pH 8.1
** This amount of calcium lactate has been optimised for high ester pectin. The amount of calcium lactate may be varied if a medium ester or low ester pectin is to be considered. This optimisation may be achieved by the performance of a series of simple experiments varying the amount of calcium lactate to optimise the high yield stress/non-gelling properties of an aqueous composition containing a pectin composition of the present invention.

The rheological effect of the strawberry juice concentrate is directly related to the amount of calcium in the juice concentrate. The concentrate may be analysed and replaced with a calcium solution e.g. a calcium lactate solution. The present Protocol has been repeated with such a solution and identical results were obtained.

The aqueous composition was stored at room temperature for minimum 48 hours and applied to a Stress Tech CS rheometer supplied by Reologica Instruments AB. The pectin sample was applied as gently as possible without stirring of the sample.

The rheometer was configured as follows

| | |
|---|---|
| Programme: | Yield Stress |
| Measurement System: | CC 25 (25 mm concentric cylinders) |
| Equilibrium time: | 900 s |
| Stress: | 0.1429-10.00 Pa, up |
| Measurement time: | 300.0 s in 60 intervals |
| Temperature: | 25° C. |

The procedure is repeated, if necessary, until the ratio of pectin composition to water required to achieve a yield stress of approximately 1 Pa is determined. This ratio provides a standardised aqueous composition.

The yield stress of a standardised pectin composition is then determined by applying (as gently as possible without stirring of the sample) the standardised aqueous composition which has been stored at room temperature for minimum 48 hours to a Stress Tech CS rheometer supplied by Reologica Instruments AB.

The rheometer was configured as follows

| | |
|---|---|
| Programme: | Yield Stress |
| Measurement System: | CC 25 (25 mm concentric cylinders) |
| Equilibrium time: | 900 s |
| Stress: | 0.1429-10.00 Pa, up |
| Measurement time: | 300.0 s in 60 intervals |
| Temperature: | 25° C. |

The presence of gelation is determined by measuring the maximum viscosity during stress viscometry.

Protocol IV

Flow Curve

To evaluate shear reversibility an aqueous composition as described in protocol II was prepared and a flow curve was obtained in accordance with the following.

The sample was stored at room temperature for minimum 48 hours and applied to a Bohlin VOR rheometer. The sample was applied as gently as possible without stirring of the sample.

The rheometer was configured as follows

| | |
|---|---|
| Programme: | Viscometry |
| Measurement System: | CC 25 (25 mm concentric cylinders) |
| Torque bar: | 20.25 gcm or 41.10 gcm |
| Shear rate: | 0.06-92 s$^{-1}$, up and down |
| Equilibrium time: | 900 s |
| Measurement time: | 608 s in 33 intervals |
| Temperature: | 25° C. |

The viscosity and shear stress as a function of shear rate is followed.

The viscosity profile as a function of shear rate illustrates the degree of shear thinning of the system.

The viscosity at any given shear, in particular 0.1s$^{-1}$ may be readily determined.

The area between the "up" and "down" curves in the flow curve corresponds to the degree of thixotropy.

Protocol V

Degree of Esterification (% DE)

To 50 ml of a 60% isopropanol and a 5% HCl solution is added 2.5 g pectin sample and stirred for 10 min. The pectin solution is filtered through a glass filter and washed with 15 ml 60% isopropanol/5% HC solution 6 times followed by further washes with 60% isopropanol until the filtrate is free of chlorides. The filtrate is dried overnight at 80° C.

20.0 ml 0.5 N NaOH and 20.0 ml 0.5 N HCl is combined in a conical flask and 2 drops of phenolphthalein is added. This is titrated with 0.1 N NaOH until a permanent colour change is obtained. The 0.5 N HCl should be slightly stronger than the 0.5N NaOH. The added volume of 0.1 N NaOH is noted as $V_0$.

0.5 g of the dried pectin sample (the filtrate) is measured into a conical flask and the sample is moistened with 96% ethanol. 100 ml of recently boiled and cooled distilled water is added and the resulting solution stirred until the pectin is completely dissolved. Then 5 drops of phenolphthalein are added and the solution titrated with 0.1 N NaOH (until a change in colour and pH is 8.5). The amount of 0.1 N NaOH used here is noted as $V_1$. 20.0 ml of 0.5 N NaOH is added and the flask shaken vigorously, and then allowed to stand for 15 min. 20.0 ml of 0.5 N HCl is added and the flask is shaken until the pink colour disappears. 3 drops of phenolphthalein are then added and then the resultant solution is titrated with 0.1 N NaOH. The volume 0.1 N NaOH used is noted as $V_2$.

The degree of esterification (% DE: % of total carboxy groups) is calculated as follows:

$$\% DE = \frac{V_2 - V_0}{V_1 + (V_2 - V_0)}$$

Protocol VI

Method of Determining CSP Content

A pectin composition was fractionated into a calcium sensitive fraction (CSP) and a none calcium sensitive fraction (NCSP) in accordance with the method below Dissolve 1% sugar free pectin in water Adjust pH to 4.5 with a solution of 10% $Na_2CO_3$ Make a fractionation solution of 60 mM $CaCl_2$/16% IPA/water Measure 20 ml fractionation solution in a 80 ml centrifugation glass Inject about 20 grams pectin solution into the fractionation solution, the precise amount to be noted Centrifuge at 5000 rpm for 20 minutes Separate Add 30 ml fractionation solution, diluted in a ratio of 1:1 with water Mix the sedimented gel and the diluted fractionation solution with a spatula and centrifuge at 5000 rpm for another 5 minutes Repeat this procedure twice Dissolve the gel with a few drops of 3 N HCl and stir with a spatula Add 60 ml 60% IPA/3% HCl/37% $H_2O$ to the dissolved gel. Mix and centrifuge at 5000 rpm for 5 minutes Wash out chloride from the material with 60 ml 60% IPA four times. Each wash is mixed, centrifuged and separated The CSP fraction is transferred to a low weight plastic petri dish (which has been weighed on beforehand)

Dry at 40° C. over night

Protocol VII

Reduced Viscosity

A quantity of pectin corresponding to 90 mg pectin dry matter is weighted into a 150 ml Erlenmeyer flask together with 100 g buffer solution which is prepared by dissolving 1 g sodium hexametaphosphate in distilled water and adjusting the pH value to 4.5 with a few drops of 4N HCL. After a few hours of stirring the pectin is dissolved. If it is not clear the solution is filtered through a porosity 2-filter crucible. Dropping periods of the resulting pectin solution and the buffer solution, respectively are measured at 20° C. in a "falling ball viscometer" (Hoeppler viscometer)

The specific viscosity is:

$\eta_{sp}$=(Dropping period for pectin solution/dropping period for buffer solution)−1

The reduced viscosity is:

$\eta_{red} = \eta_{sp}/c = \eta_{sp}/1 (L/g)$ where c is the concentration of pectin powder with 10% water, expressed in g/L.

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in chemistry or related fields are intended to be within the scope of the following claims.

The invention claimed is:

1. A standardised acidic aqueous composition comprising a deesterified pectin dissolved in water wherein the pH of the aqueous solution is less than 6, and wherein the deesterified pectin has:

(a) a degree of esterification from about 50 to 60% and (b) a calcium fraction greater than 15; and wherein the amount of the deesterified pectin in the aqueous solution is from about 0.1 to 0.5%.

* * * * *